(12) United States Patent
Davis et al.

(10) Patent No.: US 8,309,197 B2
(45) Date of Patent: Nov. 13, 2012

(54) INTEGRAL ABRADABLE SEALS

(75) Inventors: Janet Davis, Thousand Oaks, CA (US); David Marshall, Thousand Oaks, CA (US); Olivier Sudre, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 878 days.

(21) Appl. No.: 12/316,991

(22) Filed: Dec. 17, 2008

(65) Prior Publication Data

US 2010/0151183 A1   Jun. 17, 2010

(51) Int. Cl.
*B32B 7/02* (2006.01)
*F01D 11/08* (2006.01)

(52) U.S. Cl. .......... 428/86; 428/92; 428/95; 428/96; 428/309.9; 428/312.2; 415/174.4

(58) Field of Classification Search ............ 428/86, 428/92, 95, 96, 102, 309.9, 312.2; 415/170.1, 415/173.4, 174.4
See application file for complete search history.

(56) References Cited

U.S. PATENT DOCUMENTS

| | | | |
|---|---|---|---|
| 5,085,252 A | 2/1992 | Mohamed | 139/22 |
| 5,178,922 A * | 1/1993 | Ferrier et al. | 428/36.1 |
| 5,514,474 A | 5/1996 | Morgan | 428/375 |
| 5,665,463 A | 9/1997 | Morgan | 442/103 |
| 5,985,405 A * | 11/1999 | Doucette et al. | 428/86 |
| 6,063,473 A * | 5/2000 | Zafiroglu | 428/86 |
| 6,251,317 B1 * | 6/2001 | Lundberg et al. | 264/44 |
| 6,418,973 B1 * | 7/2002 | Cox et al. | 139/383 R |
| 6,716,407 B2 * | 4/2004 | Davis et al. | 423/305 |
| 6,863,999 B1 | 3/2005 | Sudre | 428/704 |
| 2004/0110440 A1 * | 6/2004 | Davis et al. | 442/178 |
| 2010/0069226 A1 * | 3/2010 | Meschter | 501/134 |

OTHER PUBLICATIONS

Dr. Keith Sharp at al., 3TEX Inc., "High Modulus Fibers in 3-D Woven and Braided CMC Preforms" pp. 1-14, Proceedings of the SAMPE Fall Technical Conference 2005, Seattle, Nov. 2005.
A.E. Bogdanovich et al., 3TEX Inc., Fabrication of 3-D Woven Preforms and Composites with Integrated Fiber Optic Sensors, SAMPE Journal, vol. 39, No. 4, pp. 1-11, Jul./Aug. 2003.
Mansour H. Mohamed, Ph.D et al., 3TEX Inc., New Generation 3D Woven Fabric Preforms and Composites, SAMPE Journal, vol. 37, No. 3, pp. 8-17, May/Jun. 2001.
Janet B. Davis et al., Rockwell Science Center, "Machinable Ceramics Containing Rare-Earth Phosphates", J. Am. Ceram. Soc. 81 [8] 2169-75, Aug. 1998.

* cited by examiner

*Primary Examiner* — Cheryl Juska
(74) *Attorney, Agent, or Firm* — Koppel, Patrick, Heybl & Philpott

(57) ABSTRACT

Devices, systems and methods for fabricating improved ceramic composite turbine shrouds with abradable seals are disclosed. A high temperature seal with an abradable coating is provided. The seal comprises a three-dimensional, high-density woven composite base structure recessed below the abradable coating, with loops incorporated in and protruding from the base structure. The abradable coating is integrally attached to the base structure via the loops. Additionally, a graded density seal is provided with a three-dimensional, low-density woven composite structure. The low-density structure is abradable. A three-dimensional, high-density woven composite base structure is recessed below the low-density structure, with the low-density structure integrally attached to the base structure via weaving.

15 Claims, 2 Drawing Sheets

COATING (0.08")

BASE CMC (0.125")

LOW DENSITY LAYER (0.08")

BASE CMC (0.125")

INTEGRAL ABRADABLE SEALS

BACKGROUND OF THE INVENTION

Field of the Invention

The potential performance benefits of ceramic composites in hot-section components of gas turbine engines, from the combustion chamber to the exhaust, are well established. However, the rate of insertion of the technology by the turbine engine industry has been slow. Several factors have contributed to this, at least including: 1) the high cost of manufacture by conventional methods, which involve either chemical vapor infiltration of stacked plies of reinforcing fibers or hand lay-up of plies (woven fabrics or unidirectional); and, 2) limitations on key performance requirements such as through-thickness properties.

Ceramic composites are inherently heterogeneous and anisotropic, with the benefits of reinforcing fibers being gained in the direction of fibers at the expense of properties in the perpendicular directions. Consequently, composites formed by 2-D lay-up methods have poor mechanical and thermal properties in the interlaminar or cross-ply direction and are thus not well matched to the requirements for turbine engine components that experience significant thermal gradients and complex stress states.

Turbine engines for aircraft or land-based power generation require turbine shrouds with abradable seals. The abradable seals are needed to maintain close tolerances with rotating turbine blade tips. Prior art has focused primarily on metallic shrouds with porous, abradable ceramic thermal barrier coatings. These systems are limited to temperatures at which the metallic shroud can retain its shape and strength. Ceramic matrix composites ("CMCs") offer potential for use at temperatures that exceed the capability of metallics, provided they are designed with reinforcement architectures tailored to the thermal and mechanical stress environment and can be fabricated with an abradable surface treatment.

Prior art for CMC shrouds has focused on laminated structures, for which delamination under the driving force of thermal gradients is a serious and design-limiting failure mechanism. This limitation can potentially be avoided by forming the composite from 3-dimensional fiber preforms produced using textile methods such as weaving. Furthermore, the use of 3-D preforms can provide a means for forming the abradable surface treatment as an integral portion of the shroud, with reinforcing fiber tows common to both and formed in a single weaving process. This approach can significantly improve the design space and potentially reduce cost for ceramic composite shrouds.

SUMMARY OF THE INVENTION

The present invention provides systems and methods for fabricating high temperature, resilient, and reliable ceramic composite turbine shrouds with integrated abradable seals based on 3-D woven structures combined with ceramic-yielding matrices. These systems and methods allow for, amongst other improvements: integral seals that will not delaminate; seals that can be co-processed with a ceramic matrix; and, seals with abrasion resistance that can be tailored to numerous desired applications. One embodiment according to the present invention comprises a high temperature seal with an abradable coating and a three-dimensional, high-density woven composite base structure recessed below the abradable coating. Additionally, loops are incorporated in and protruding from the base structure, with the abradable coating integrally attached to the base structure via the loops.

Pursuant to another specific embodiment according to the present invention, a graded density seal is provided with a three-dimensional, low-density woven composite structure, with the low-density structure being abradable. Furthermore, a three-dimensional, high-density woven composite base structure is provided that is recessed below the low-density structure, with the low-density structure being integrally attached to the base structure via weaving.

In accordance with yet another specific embodiment, a method for forming abradable seals is provided. The method comprises forming an abradable structure, forming a three-dimensional, high-density woven base structure from a machinable ceramic composite material recessed below the abradable structure, and integrally attaching the abradable structure to the base structure via weaving.

These and other further features and advantages of the invention would be apparent to those skilled in the art from the following detailed description, taken together with the accompanying drawings, in which:

DETAILED DESCRIPTION OF THE INVENTION

Figure 1:
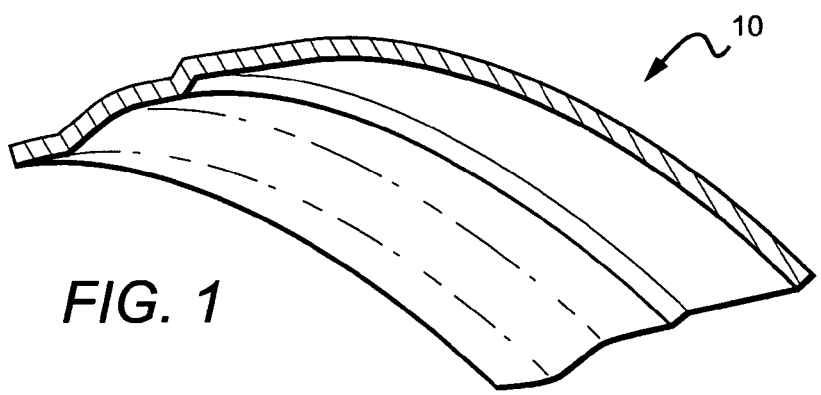
FIG. 1 is a cross-sectional view of a shroud segment according to the present invention.

The following description presents several possible embodiments. This description is not to be taken in a limiting sense, but is made merely for the purpose of describing the general principles of the invention, the scope of which is further understood by the appended claims.

The present invention provides a new approach for fabricating ceramic matrix composite shrouds with abradable seals to be preferably incorporated in turbine engines for aircraft or land-based power generation. Turbine engine shrouds need abradable seals that maintain close tolerances with rotating blades. It is preferable to form abradable features as integral portions of a CMC shroud. Thus, ceramic composite turbine shrouds with abradable seals are provided, which are based on 3-D woven composite structures combined with matrices preferably comprised of a ceramic-yielding solution, such as monazite, to enhance toughness and abradability. In another preferred embodiment, ceramic composite turbine shrouds with abradable seals are provided, which are based on a graded 3-D woven structure that prevents delamination and allows tailoring of abrasion resistance.

Abradable seals according to the present invention provide many improvements and overall superior performance compared with other existing seal technologies. For example, some of the improvements resulting from the novel seals include: integral seals that will not delaminate or have improved delamination resistance; seals that can be co-processed with CMC; and, abrasion resistance that can be specifically tailored to a given application. More specific advantageous features of the seal according to the present invention include, but are not limited to: 3-D preforms with through-thickness reinforcements in the abradable portion; good thermal expansion match to the CMC shroud; hardness and abrasion resistance scaled with density so surface wear properties can be tailored; and, use of hybrid weaving yarns to provide a means for minimizing matrix cracking between fiber tow bundles in low fiber density portions of the preform.

Ceramic composites according to the present invention preferably consist of ceramic fibers (usually in the range of 10-20 μm diameter and often woven into fabrics) and a matrix that is also ceramic. When suitably made, they are strong, tough materials that can be used in a wide range of high temperature structural components, including engines (power generation turbines, aircraft engines, rocket engines, hypersonic engines), hot airframe structures, and thermal protection systems.

The choice of materials for the fibers and matrix is usually driven by: the high temperature chemical environment of the application, the mechanical properties requirements, and lifetime requirements. For short lifetimes and very high temperatures, carbon or SiC are generally chosen. For long lifetimes in oxidizing environments, carbon or SiC-based materials must be protected with environmental barrier coatings. However, these coatings add to the expense of the system. Thus, for long lifetimes, sufficiently strong oxide materials are generally chosen since they are thermodynamically stable in the environment.

Oxide fibers can be selected from any commercially available choices including, but not limited to, Nextel 610 alumina fibers and Nextel 720 mullite-alumina fibers, which are discussed in more detail below. The matrix can be formed with any refractory oxide, which may include alumina, mullite, zirconia, monazite, or any combination thereof. Preferably, the matrix is dense enough to protect fibers from chemical reaction with water vapor or fuel impurities. As discussed below in more detail, the preferred approach to form dense oxide matrix composites is to use monazite as a constituent of the matrix, which acts as a fiber coating to ensure the matrix bonds weakly to the fibers as required for damage tolerance. However, it is understood that other suitable materials may also be used.

Non-oxide fibers can be selected from any commercially available choices of SiC fibers, including, but not limited to, Nicalon or Sylramic. The matrix can be formed with pre-ceramic polymer precursors to SiC.

Shroud segment 10, as shown in FIG. 1, helps to demonstrate the manufacturing process. Components such as shrouds, flaps and seals have relatively simple shapes and generally require thicker composites (~0.1 inch or higher) that would benefit from the 3-D weaving technology. They are suitable as a basis for developing and demonstrating a widely applicable manufacturing process. Shapes are expected to fall within a range that can be achieved by draping a flat 3-D woven preform with thickness ~0.125 to 0.25 inch over tooling which sets the final component shape. 3-D weaving of fabric performs with Nextel 720 mullite fibers, as well as 3-D weaving of a variety of other high modulus fibers, such as pitch carbon and SiC, have been demonstrated.

The material system chosen for the structural portion of the shroud comprises a composite produced with an orthogonal weave fiber perform, such as an oxide composite preferably consisting of alumina fibers in a matrix of alumina and monazite, although it is understood that other suitable materials may also be used. The materials chosen for the abradable portion of the shroud will also preferably comprise alumina and monazite for reasons detailed below, although other suitable materials may also be used. As indicated, oxide composites have been identified as a preferred material for such a component, because of their stability in the high-temperature, oxidizing environment of the engine exhaust.

A matrix of alumina/monazite is preferable for its high temperature stability and compatibility with the fibers. However, it is understood that other suitable materials may also be used. The presence of monazite in the matrix and particularly at the surface of fibers allows debonding of the fibers (as required for toughening of the composite) and prevents sintering of the matrix to the fibers. Monazite and two-phase mixtures of monazite and other refractory oxides have also been shown as machinable with conventional metal-working tools. This makes them ideally suited constituents for the matrix of abradable surfaces.

Figure 2:
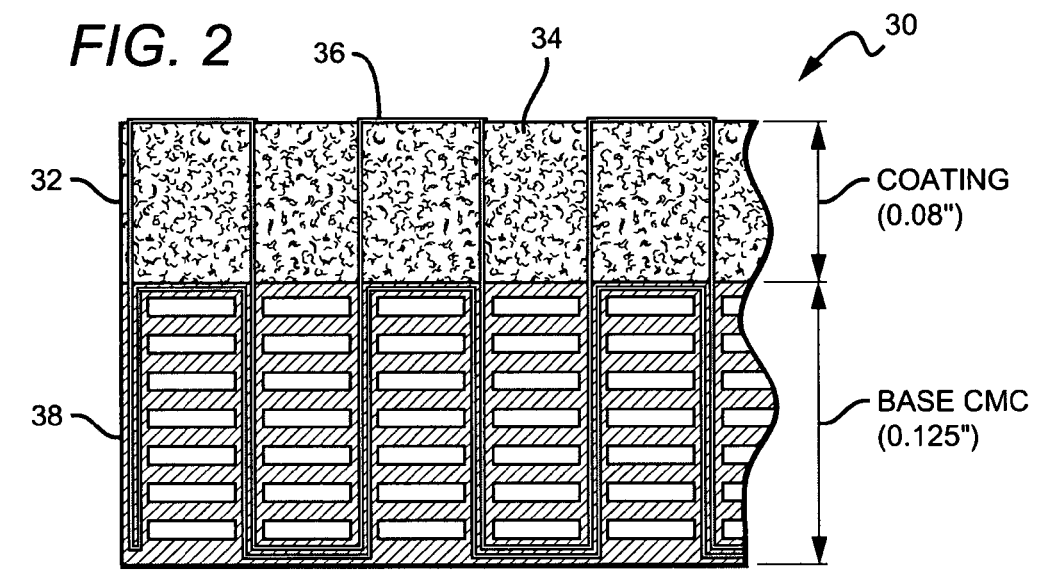
FIG. 2 is a schematic view of a 3-D orthogonal weave composite according to one embodiment of the present invention.
Figure 3:
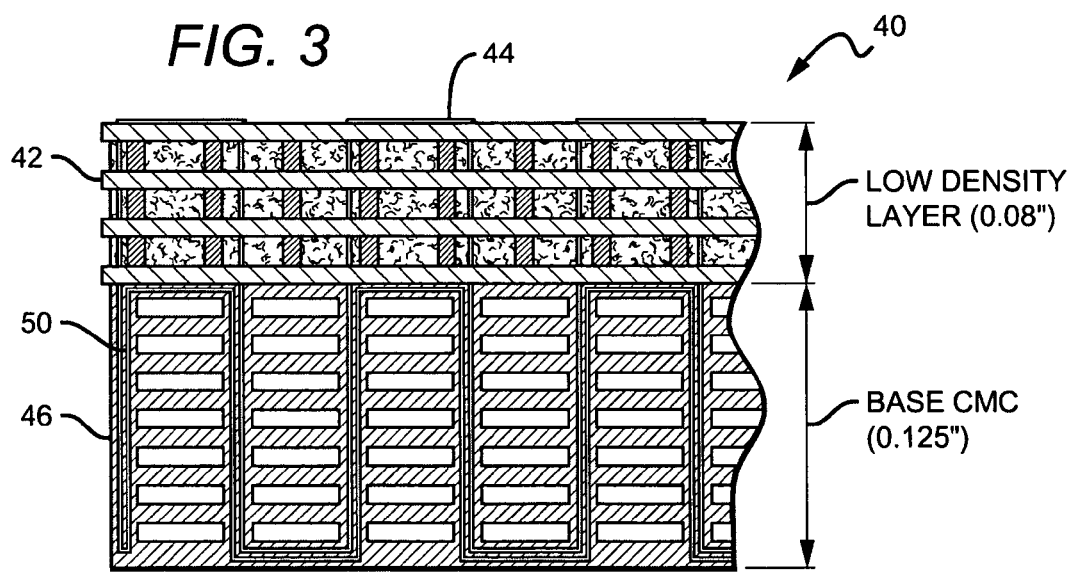
FIG. 3 is a schematic view of a 3-D orthogonal weave composite according to another embodiment of the present invention.
Figure 6:
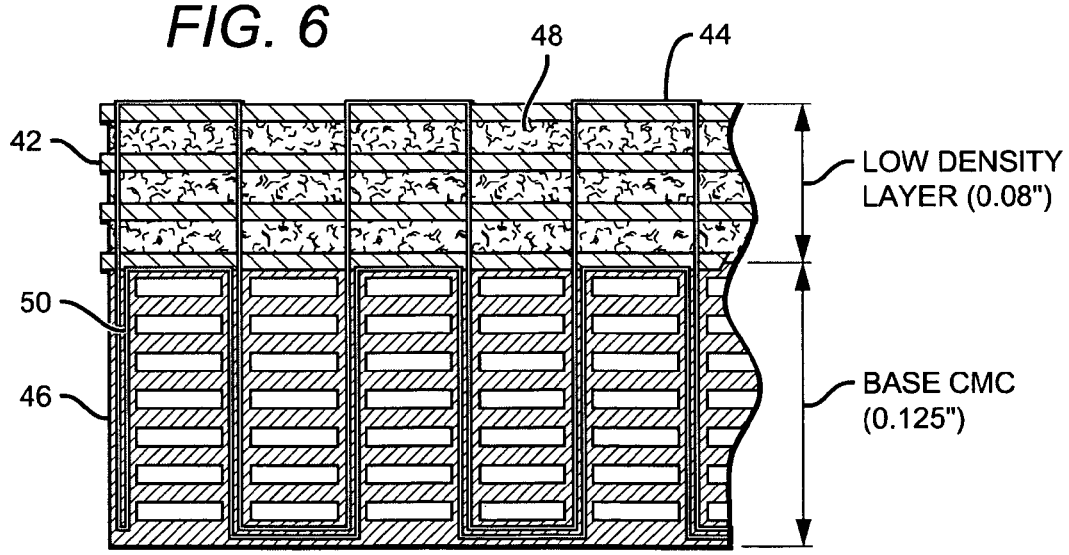
FIG. 6 is a schematic of a 3-D orthogonal weave composite with fiber tow bundles according to another embodiment of the present invention.

At least two approaches for forming integral abradable surfaces are applicable to the present invention. In the first preferred approach and as best shown in FIG. 2, mechanically attaching an abradable surface component to the preform is disclosed. In the second preferred approach and as best shown in FIGS. 3 and 6, tailoring of the composite surface through manipulation of the weave architecture and matrix microstructure to control the hardness and abrasion behavior of the composite is disclosed. The former approach takes advantage of integral preform features such as protruding fabric loops to mechanically anchor an abradable surface layer to the composite. The latter approach takes advantage of the inherent machinability of monazite and monazite-alumina two phase ceramics as well as novel methods to incorporate discontinuous small diameter refractory fibers throughout the matrix rich regions of the abradable surface to minimize cracking.

In the first concept, a 3-D orthogonal weave composite 30 with an integrally attached coating 32 is provided. The integral, porous coating is provided for cutting properties, and is reinforced with discontinuous, felt-like fibers 34 similar to shuttle tile. The coating is preferably shown as ~0.08 inches thick, but it is understood that varied thicknesses are possible due to a variety of desired applications. The coating is linked by integral weaving via loops 36 to a base composite 38, with the loops protruding from the shroud surface. The base composite is preferably shown as ~0.125 inches thick, although it is understood that varying thickness are possible due to varying desired applications.

The hardness/cutting properties are controlled by the addition of ceramic particles and/or the porosity to the coating. The tile or felt insulation may be inserted beneath the loops directly in contact with the structural CMC portion, and the entire assembly can preferably be infiltrated with a monazite solution precursor to enhance the hardness of the tile and bond it to the CMC. Previous experience, as shown in U.S. Pat. No. 6,716,407 to Davis et al. and U.S. Pat. No. 6,863,999 to Sudre et al., has demonstrated the utility of this approach.

The second approach will rely on decreasing the density of the oxide fiber tows near the surface of the component and forming a continuous low density, low hardness matrix in that region. Thus, a 3-D orthogonal weave composite with a graded density 40 is provided. The graded density composite comprises a low density ceramic-yielding infiltrated CMC 42 linked by integral weaving 44 to the base composite 46. The low density layer and the base CMC are preferably shown as ~0.08 inches thick and ~0.125 inches thick respectively, although it is understood that varying thicknesses may also be desirable depending on the application of the shroud and seal.

The ceramic-yielding material is preferably formed of monazite, although it is understood that other suitable materials may also be used. The hardness/cutting properties of the graded density composite are controlled by the density of the reinforcements and the density and composition of the matrix.

Figure 5:
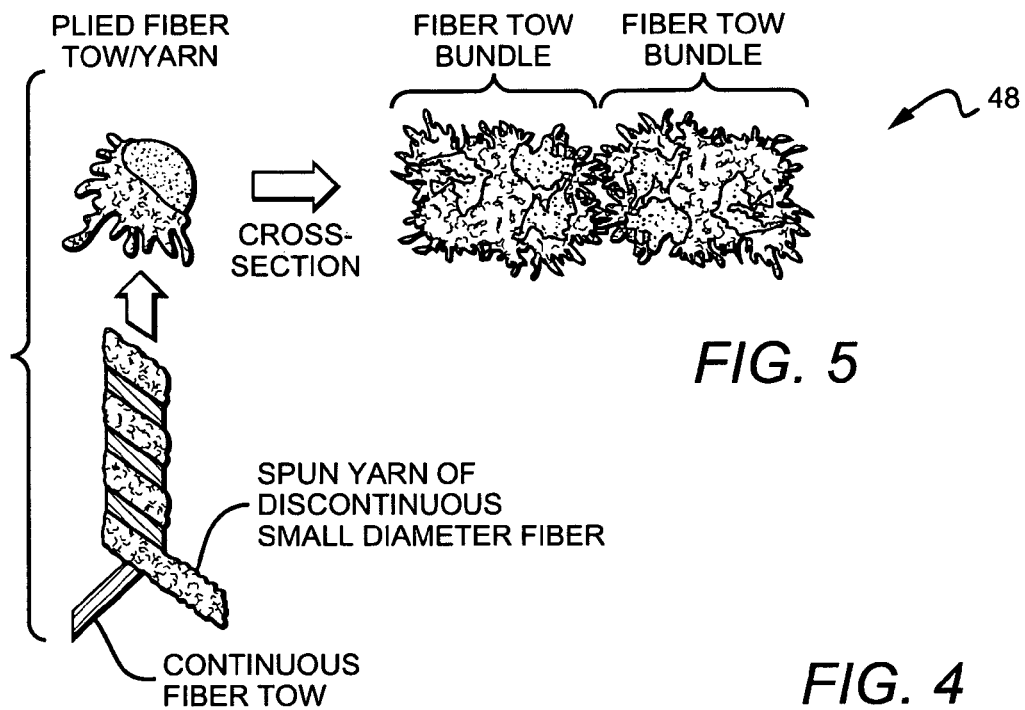
FIG. 5 is a schematic view of a plied fiber tow/yarn according to the present invention.

Moreover and as best shown in FIGS. 5 and 6, in the graded density composite, carbon tow can be incorporated in the weave during the weaving process as needed to maintain thickness, uniformity and appropriate tensioning of the weaving yarns. These carbon yarns can be removed by heat treatment prior to matrix infiltration to increase the porosity near the surface. The base CMC has through-thickness reinforcements 50 recessed below the abradable section to provide high interlaminar strength to the shroud.

In another proposed approach to minimize fiber cracking in the matrix-rich regions, novel hybrid yarns 48, preferably fabricated by plying Nextel tows with yarns formed of small diameter (~5 micron) filaments, could be used as fill in this region. The discontinuous or fuzzy yarns 48 would fill space between the Nextel tows to minimize matrix cracking without increasing the hardness as much as well-packed continuous fibers would. Monazite precursor solution mixed with various ceramic fillers would be used to form the remainder of the matrix.

Due to multiple weft insertions per weaving cycle, 3-D weaving processes enable fiber architectures that integrate structural elements, such as attachments. Selective placement of fiber types through the preform can make a composite material whose properties change throughout the material. This could be used for precise tailoring of stiffness, for controlled thermal expansion, or for graded thermal conductivity.

Figure 4:
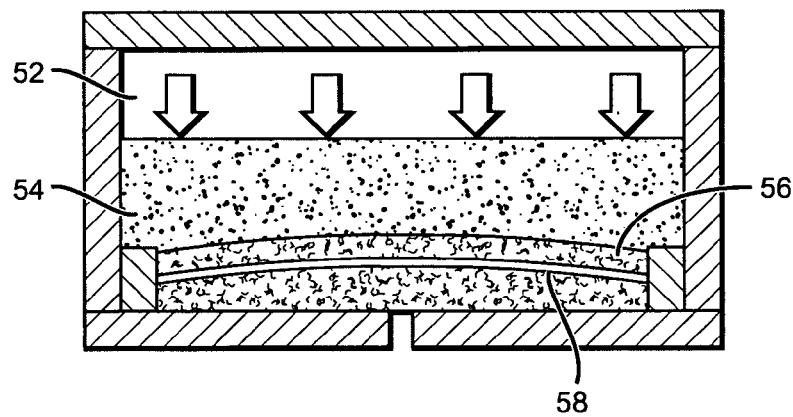
FIG. 4 is a schematic view of a filter filtration process for a matrix according to the present invention.

Once the fiber preform is constructed, a two-phase alumina/monazite matrix can be formed within the fiber preform using a method comprising several steps as shown in FIG. 4. However, it is understood that other suitable methods known in the art may also be used. First, a porous matrix of a fine ceramic powder is formed by pressure filtration 52 of aqueous slurry 54 of fine dispersed particles into the fiber preform 56. A tool with one surface lined by a porous sintered stainless steel filter 58 may be used during the filtration process to define the final shape of the part.

After drying and removal from the tool, the self-supporting part is heat-treated. The monazite ($LaPO_4$) phase is then introduced into the porous composite by vacuum infiltration of an aqueous solution containing a solution precursor (La and P ions and complexes) that forms monazite upon drying and heat treatment. The monazite solution precursor is drawn by capillary action to fine-scale pores in the matrix and to fiber surfaces, resulting in a fine-scale monazite-alumina matrix with nearly continuous coatings of monazite around all of the fibers. The final density of the matrix can be adjusted within the range of ~60 and 80 volume %, by using multiple cycles of precursor infiltration.

The primary difficulty in producing oxide-oxide CMCs based on 3-D woven preforms with this infiltration method is in preventing the formation of matrix cracks in the residual voids of the 3-D fiber architecture during processing. The cracking in the matrix is dependant on the initial matrix density and the dimensions over which it is constrained as it tries to shrink while sintering. The fiber network or any other non-sintering constituents induce constraint. If the matrix pockets are porous and large enough then sintering shrinkage causes cracking. Historically, this problem has been reduced in 2-D laminates by adding large particles or chopped fibers between the plies to reduce the scale of shrinkage during sintering. Although 3-D orthogonal preforms have no interlaminar regions conducive to crack formation, residual voids exist throughout their thickness adjacent to the Z-yarn paths through the fabric.

In an improved approach, infiltrating the powder matrix to the highest possible density and then adding matrix material via monazite precursor solution infiltrations to further increase the matrix density in these regions prior to sintering is employed.

In a final phase of forming a shroud with an integral seal, a useable component with a surface on the shroud that can be abraded by a rotating blade without causing blade damage must be demonstrated. This is crucial for sealing. For a coated system as is typical in prior art, spallation is a critical concern. Thus, an integrally attached surface with the right wear characteristics can significantly enhance system reliability. Tailoring the surface of a subcomponent to have the desired wear performance according to a specific application is crucial. Key to this aspect of the present invention is the use of a ceramic-yielding substance such as monazite. Two appropriately applicable approaches for forming the integral seal are discussed in detail above.

CMC components with integral seals according to the present invention will allow gas turbine engines to operate at higher temperatures with attendant increases in output and efficiency, while also reducing engine weight. The 3-D fiber architecture of the present invention eliminates one of the major failure modes of the CMC components: delamination. Furthermore, the technology proposed here will extend to other gas turbine engine parts that are currently difficult or expensive to manufacture.

Some of the main benefits of the proposed approach for fabricating oxide composite turbine shroud components using 3-D fiber preforms and a method for matrix infiltration by pressure filtration include, but are not limited by, the following: 1) an effective and reliable route for increasing and tailoring through-thickness properties (strength, stiffness, conductivity) for specific component requirements and eliminating delamination as a failure mechanism; 2) significant decreases in the cost of fabricating components by decreasing the hand labor involved in infiltration and lay-up of multiple layers of 2-D fabrics; 3) additional cost savings through the use of tooling for the matrix infiltration process that is completely reusable and reconfigurable by simply changing the porous filter contour; 4) the materials envisioned for the matrix are either commercially available from a number of sources or can be produced inexpensively; and, 5) simple visual inspection techniques for fiber alignment within the filtration tool can be implemented to ensure alignment in the finished product, which will greatly minimize processing defects associated with layer-to-layer fiber misalignment produced during lay-up and lamination of parts produced with 2-D fabrics.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:
1. A high temperature seal, comprising:
an abradable surface; and
a three-dimensional woven composite base structure recessed below said abradable surface, said woven composite base structure produced with a fiber preform, at least some of said preform's weave fibers extending from said base structure and over said abradable surface so as to anchor said abradable surface to said base structure.

2. The seal of claim 1, wherein said abradable surface is porous.

3. The seal of claim 2, wherein said abradable surface is reinforced with discontinuous ceramic fibers.

4. The seal of claim 3, wherein said discontinuous ceramic fibers will be inserted beneath said weave fibers extending from said base structure and over said abradable surface, such that said discontinuous ceramic fibers are directly in contact with said base structure, thereby forming a fiber-reinforced assembly.

5. The seal of claim 4, wherein said fiber-reinforced assembly is infiltrated with a ceramic-yielding solution to enhance strength.

6. The seal of claim 5, wherein said ceramic-yielding solution forms a rare earth phosphate upon heat treatment.

7. The seal of claim 1, wherein ceramic particles and/or porosity are added to said abradable surface to control the hardness and/or cutting properties of said abradable surface.

8. The seal of claim 1, wherein said base structure acts as a support for said abradable surface.

9. The seal of claim 1, wherein said seal is resistant to delamination and spallation.

10. The seal of claim 1, wherein said base structure comprises a composite produced with an orthogonal weave fiber preform.

11. The seal of claim 1, wherein said base structure comprises a ceramic matrix composite (CMC).

12. The seal of claim 1, wherein said abradable surface comprises ceramic.

13. The seal of claim 1, wherein the thermal expansion characteristics of said abradable surface and said base structure are closely matched.

14. The seal of claim 1, wherein said seal is incorporated in shrouds for turbine engines.

15. The seal of claim 14, wherein said seal maintains a close tolerance with the rotating blades of said turbine engines.

* * * * *